May 12, 1942.  F. KOCH  2,283,153
MILLING MACHINE
Filed Dec. 21, 1939
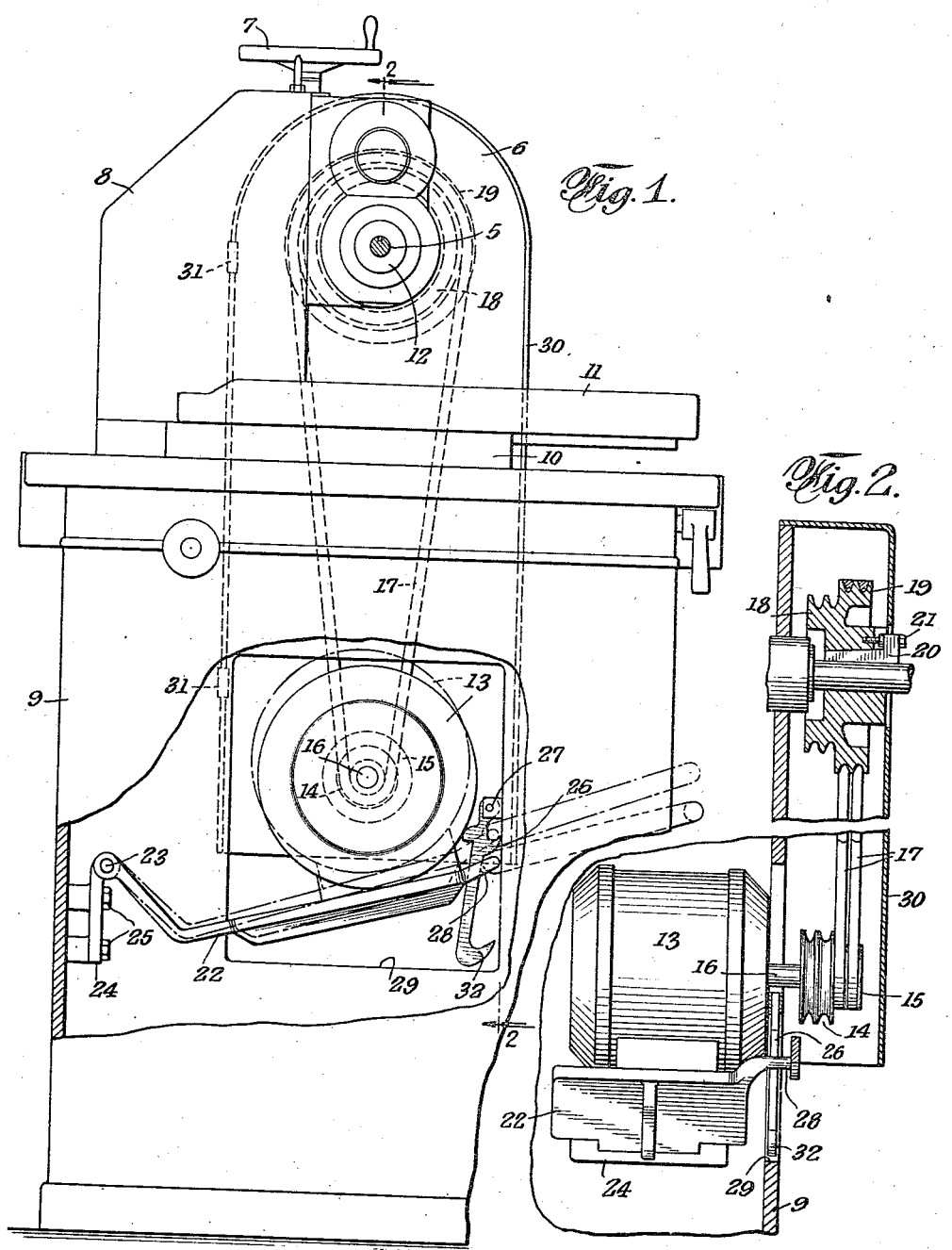
INVENTOR
FREDERICK KOCH
BY
ATTORNEY Patented May 12, 1942

2,283,153

UNITED STATES PATENT OFFICE 2,283,153

MILLING MACHINE

Frederick Koch, Sparta, N. J., assignor to Associated Patentees, Inc., Ampere, N. J., a corporation of New Jersey Application December 21, 1939, Serial No. 310,322

3 Claims. (Cl. 90—16)

The invention here disclosed relates to milling machines and is a continuation in part of patent application, Ser. No. 165,033 filed September 22, 1937, Patent 2,202,210 of May 28, 1940.

Special objects of the invention are to provide simple, direct drive connections from the motor to the cutter spindle which will provide and maintain proper belt tension and automatically take up for wear and compensate for misalignment, facilitate necessary changes and adjustments and allow for such vertical and horizontal shifting movements of the cutter spindle as may be required.

Other desirable objects and the novel features of construction, combination and relation of parts by which objects of the invention are attained will appear and are hereinafter set forth and broadly claimed.

The accompanying drawing illustrates one practical commercial embodiment of the invention. The structure however may be modified and changed as regards this disclosure, within the true intent of the invention as will appear from the scope of the claims.

Fig. 1 is a broken part sectional front elevation of a milling machine having the invention incorporated therein.

Fig. 2 is a broken part sectional view on substantially the plane of line 2—2 of Fig. 1.

In the machine illustrated, the cutter spindle 5, is journalled in a head 6, vertically adjustable as by means of hand wheel 7, on the pedestal portion 8, rising from the hollow base structure 9. The latter carries the guide 10, for the work-carriage 11.

The cutter spindle is journalled in bearings 12, and these, as disclosed in the patent application referred to, may be adjustable in the head 6, for shifting the spindle longitudinally. Thus the spindle may have horizontal as well as vertical adjustments.

The drive of the spindle is effected by a motor 13, shown in Fig. 2, as carrying relatively large and small size twin pulleys 14, 15, on shaft 16, to be connected by twin V belts 17, with correspondingly located small and larger size twin pulleys 18, 19, on the cutter spindle.

These pulleys may be integrally constructed as shown and adjustably secured on their shafts as by wedge keys or gibs 20, which can be shifted longitudinally and held in set position by screws as indicated at 21.

Proper belt tension is automatically maintained and various adjustments of the cutter spindle are accommodated in the present invention by suspending the motor in the bight of the driving belts. In the illustration, this is accomplished by mounting the motor on a support 22, pivoted at one end at 23, to a bracket 24, secured at 25, to one side of the hollow machine base. This hinged mounting is of substantial design, so as to maintain the motor properly aligned with the cutter spindle, while thus hung in the driving connections.

To enable ready changing of the belts from one set of pulleys to the other, the hinged motor support may be hooked up to take the weight off the belts, in the illustration, by a hook 26, pivoted on the base at 27, at a point adjacent the free end of the hinged motor base 22, in position to catch the lifting handle 28, projecting angularly from the free end of the swinging motor base.

The motor lifting handle 28, is shown as projecting out through an opening or doorway 29, in the back side of the machine base and the hook 26, is shown as hung as a gravity latch to automatically catch and hold the handle when the latter is lifted within the reach of the hook. When thus caught, as indicated in broken lines in Fig. 1, the motor will be supported entirely free of the belts and the latter can then be easily removed as for shifting from one set of pulleys to another. After such change is made, the handle may be lifted to take the weight off the hook which then can be swung out of line with the handle and the latter lowered to again hang the weight of the motor in the bight of the belts. Vertical adjustments of the spindle head merely have the effect of raising and lowering the motor, without altering the driving relation or changing the belt tension.

A belt guard is shown at 30, hinged to the side of the base at 31, over the belt and pulley connections and preferably covering also the motor lifting handle and supporting latch. With this guard swung open, the lifting handle, swinging motor, support, latch, motor and motor pulleys are fully accessible through doorway 29, but with the guard closed, these parts are covered either wholly or partially and protected to a desired extent.

In the construction shown, with the motor mounted on a lever pivoted at one end, substantially the full weight of the motor is hung in the loops of the drive belts and this is usually a desirable relation. However, with different lever arrangements only part instead of the whole weight of the motor may be suspended by the belts.

To prevent any possibility of dropping the motor through a belt or belts giving way, the latch may be equipped with a hook 32, sufficiently below the handle to allow for belt stretch and vertical adjustments of the spindle and adapted to catch the handle and hence support the motor in case of belt failure or excessive stretch.

Drive connections to the work carriage are not shown but it will be understood that the same is operated in proper relation to the cutter spindle.

What is claimed is:

1. In a milling machine, a hollow machine base, a free swinging lever pivotally hinged at one end to one side of said hollow base, a motor fixed on said hinged lever, a spindle journalled on the base above said motor, belt drive connections between said spindle and motor and supporting said motor and hinged lever, a handle projecting from the opposite end of said hinged lever and a pivoted, free swinging releasable catch for supporting said handle in uplifted position.

2. In a milling machine, a hollow machine base, a free swinging lever pivotally hinged at one end to one side of said hollow base, a motor fixed on said hinged lever, a spindle journalled on the base above said motor, belt drive connections between said spindle and motor and supporting said motor and hinged lever, a handle projecting from said hinged lever and a releasable catch for supporting said handle in uplifted position, said catch having a dependent hook spaced below the handle in position to catch the same in case of belt failure.

3. In a machine of the character disclosed, a vertically adjustable head, a cutter spindle journalled in said head and vertically movable therewith, a pulley on said spindle, a motor below said head and having a shaft with a pulley thereon in vertical alignment with said spindle pulley, a motor supporting lever, a horizontal pivot for said lever, located to one side of said motor shaft for guiding said supporting lever and motor in vertical tilting movements about the pivot center, a drive belt extending about said pulleys and supporting said motor in suspended relation, said motor having freedom of movement to rise and fall with the vertical adjustments of the spindle head and to apply substantially equal tension to the drive belt in all such vertical adjustments of the spindle, said drive belt and pulleys being of multiple V-belt construction and the suspension of said motor in the manner described tending to equalize wear and tension on the individual elements of said V-belt structure.

FREDERICK KOCH.